United States Patent
Tani

[11] Patent Number: 5,414,683
[45] Date of Patent: May 9, 1995

[54] OPTICAL HEAD USING IMAGE SENSOR OF XY ADDRESS TYPE IN PHOTO DETECTOR

[75] Inventor: Naoaki Tani, Hachioji, Japan

[73] Assignee: Olympus Optical Co., Ltd., Tokyo, Japan

[21] Appl. No.: 967,371

[22] Filed: Oct. 28, 1992

[30] Foreign Application Priority Data

Oct. 31, 1991 [JP] Japan .................. 3-286686

[51] Int. Cl.⁶ .............................. G11B 7/00
[52] U.S. Cl. ................ 36.9/47; 369/44.110; 369/124; 235/454
[58] Field of Search .............. 369/124, 44.11, 44.41, 369/44.42, 54, 47, 44.26; 235/454, 456, 494; 358/342; 250/201.5, 201.8

[56] References Cited

U.S. PATENT DOCUMENTS

| | | | |
|---|---|---|---|
| 4,224,480 | 9/1980 | Satoh et al. | 369/44.42 |
| 4,716,282 | 12/1987 | Akashi et al. | 250/201.18 |
| 4,819,222 | 6/1989 | Kimura | 369/124 |
| 4,918,415 | 4/1990 | Hashimoto et al. | 235/454 |
| 5,008,521 | 4/1991 | Ohki et al. | 225/454 |
| 5,210,565 | 5/1993 | Albrecht | 354/402 |

FOREIGN PATENT DOCUMENTS 63-824 1/1988 Japan .

OTHER PUBLICATIONS

Joit vol. 3, No. 2/1988 P32-38.

*Primary Examiner*—Aristoelis Psitos
*Assistant Examiner*—Thang V. Tran
*Attorney, Agent, or Firm*—Armstrong, Westerman, Hattori, McLeland & Naughton

[57] ABSTRACT

A CMD of XY address type is used as a photo detector. X and Y address signals output from the X and Y address generating circuit are applied to the CMD mechanically fixed to an optical head. Output from the CMD is binary-coded by a binary-coded circuit. A central position of a duration in which "H" continues in a mean-value circuit is stored by an X and Y address detection & memory circuit as a reference XY address. An address range is set in which reading is executed on the basis of the reference XY address. The XY address within this address range is assigned to produce an optical picture element signals within a corresponding light receiving region. A playback signal, a focus error signal and a tracking error signal are generated from the optical picture element signals.

18 Claims, 10 Drawing Sheets

$(A+B)-(C+D) > 0$

AT FOCUSING $(A+B)-(C+D) = 0$ $(A+B)-(C+D) < 0$

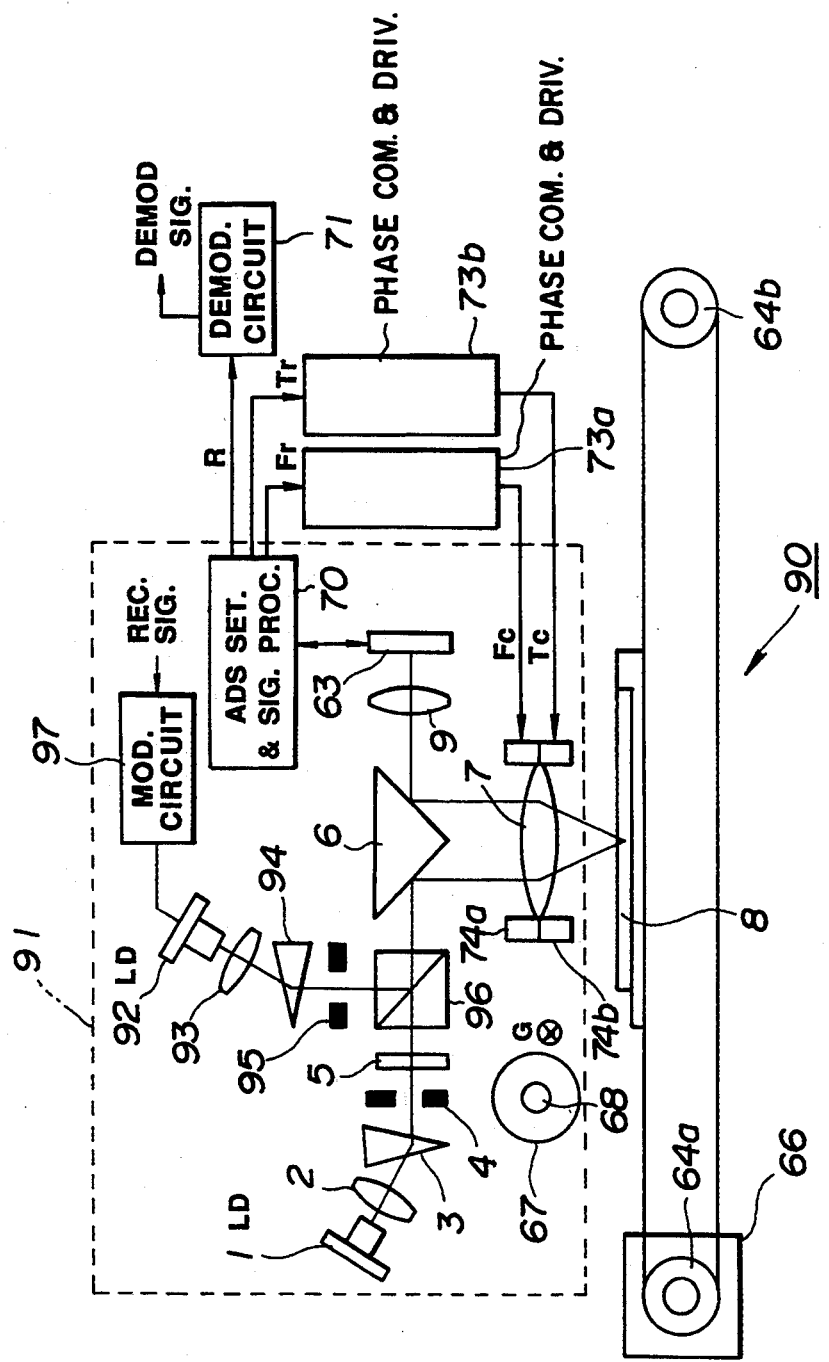

OPTICAL HEAD USING IMAGE SENSOR OF XY ADDRESS TYPE IN PHOTO DETECTOR

BACKGROUND OF THE INVENTION

Field of the Invention and Related Art Statement

The present invention relates to an optical head using an image sensor of XY address type in an optical information recording and playback apparatus for optically recording or playing back information.

An optical head which is used in an optical information recording and playback apparatus for optically recording or playing back information is arranged such that an optical beam generated from a light source is irradiated onto an optical recording medium, and at least a part of a beam reflected or transmitted through the optical recording medium is received by a photo detector, so that a focus error signal or a tracking error signal is generated for exact execution of recording and playback, or a signal for playing back the information on the optical recording medium is generated.

A prior art example of an optical head used in an apparatus for optically playing back information, in which a rectangular optical card serves as an optical recording medium will hereunder be described.

FIG. 1 of the attached drawings shows an arrangement of an optical system of an optical head which executes detection of a focus error of axis-missing type and detection of a tracking error of the three beam type. Solid lines In FIG. 1 show an optical axis of the beam, but do not show a beam configuration. The optical beam generated by a laser diode 1 is brought to a substantially an ellipse shaped parallel beam by a collimator lens 2.

The parallel beam is reduced along only the major-axis direction of the ellipse by a shaping prism 3, and is shaped substantially into a circle, and a diameter of the parallel beam is restricted by a circular iris or stop 4 such that the size of a spot on the optical recording medium (that is, an optical card 8) is brought to a predetermined value. The parallel beam is further divided into three optical beams including one beam comprised of zero-order diffracted light and two beams respectively comprising ± primary diffracted light by a diffraction grating 5, and these three beams are reflected by a mirror 6. Subsequently, the parallel beam is incident upon an objective lens 7 at a position which is eccentric with respect to the optical axles of the objective lens 7.

These three optical beams are condensed by the objective lens 7, and are irradiated onto the optical card 8 in which a plurality of tracks 12, 12, . . . are formed. Thus, the three optical beams are caused to form three circular spots, respectively, as shown in FIG. 2. Meanwhile, the three optical beams reflected from the optical card 8 pass through the objective lens 7 in an opposite direction so that they become substantially parallel light beams. The parallel light beams are reflected from the mirror 6 and, subsequently, are incident upon the condensing lens 9. These three beams are condensed onto a photo detector 10 by the condensing lens 9.

The photo detector of the optical head according to the prior art example is arranged as shown in FIG. 3(b) such that a light receiving surface is divided into elements which are arranged thereon. Upon focusing, the light receiving elements are so regulated as to be located at an appropriate position with respect to the optical beam such that the optical beam of the zero-order diffracted light is located at the center of a four-divided light receiving device 20 having four light receiving elements A, B, C and D, and two optical beams comprised of primary diffracted lights form spots at a center of a light receiving element 21 of E and at the center of a light receiving element 22 of F, respectively.

A method of detecting the focus error will be described with reference to FIG. 3a and FIG. 3b. The optical beam comprised of the zero-order diffracted light indicated as an optical axis 17 is reflected from the mirror 6, and is incident upon a position eccentric with respect to the optical axis of the objective lens 7, and is condensed onto the optical card 8. At this time, if the optical card 8 is located at the focusing position of the objective lens 7, the optical beam reflected from the optical card 8 becomes an optical beam designated as an optical axis 18. The optical beam is reflected by the mirror 6 and, subsequently, is condensed by the condensing lens 9, to form a spot at a position designated as 19 on the optical detector 10. Output signals from the four-divided light receiving device 20 then have the relationship of $(A+B)-(C+D)=0$.

On the other hand, if the optical card 8 is displaced in a direction indicated by an arrow a in FIG. 3(a) and is brought to a position spaced apart from the focus position of the objective lens 7, the optical beam reflected from the optical card 8 is brought to an optical beam designated as an optical axis 18a so as to form a faded spot having its center at a position designated as 19a on the photo detector 10. Output signals from the four-divided light receiving device 20 have the relationship of $(A+B)-(C+D)<0$. Further, when the optical card 8 is displaced in the direction indicated by arrow b so as to be located at a position spaced away from the focus position of the objective lens 7, the optical beam reflected from the optical card 8 is brought to an optical beam designated as the optical axis 18b and forms a faded spot having its center at a position designated as 19b on the photo detector 10. The output signal from the four-divided light receiving device 20 have the relationship of $(A+B)-(C+D)>0$. Accordingly, a value $(A+B)-(C+D)$ derived from the output signals from the four-divided light receiving device 20 on the optical detector 10 becomes a focus error signal.

A method of detecting a tracking error will be described next. As shown in FIG. 2, two primary diffracted optical beam spots 15 and 16 are respectively located such that a part of each overlaps one of track guides 11. Under a condition in which there is no tracking error, equal positions of the respective spots 15 and 16 of the primary diffracted beams overlap the track guides 11. Accordingly, the quantities reflected from the track and track guides at the spots 15 and 16 respectively are equal to each other. Thus, an output signal from the light receiving element 21 of E shown in FIG. 3(b) and an output signal from the light receiving element 22 of F have the relationship of $E-F=0$.

On the other hand, when a tracking error is generated, the overlapping portions of the respective spots 15 and 16 on the track guide 11 become different in size from each other. Thus, the quantity of light reflected from the track and track guide at the spot 15 and the quantity of light reflected at the spot 16 are different from each other due to a difference in the reflectance of the track guide 11 and the reflectance of an information recording track 12.

For the reason discussed above, the output signal from the light receiving element 21 of E and the output signal from the light receiving element 22 of F have the relationship of E−F>0 or E−F<0, depending upon the direction in which the track shifts. Accordingly, a value (E−F) namely, the distance between the value of the output signal from the light receiving element 21 and the output signal from the light receiving element 22 on the photo detector 10 are computed and become the tracking error signal.

As discussed above, under a condition in which there is no focus error and no tracking error, the photo detector 10 is adjusted such that the focus error signal and the tracking error signal are both brought to zero with respect to the three optical beams, so that detection of focus error and tracking error can be accurately executed. Accordingly, when the objective lens is feedback-controlled along the focus direction and along the tracking direction on the basis of the detected signal, the optical beam comprised of zero-order diffracted light is always accurately focussed so as to create an optical beam spot 14 on the optical card and, simultaneously, is so controlled as to be positioned at the center of the information recording track 12, as shown in FIG. 2.

Accordingly, upon recording, a plurality of pits 13 can be formed accurately on the information recording track 12 by the optical beam spot 14 of the zero-order diffracted light modulated on the basis of information to be recorded. Upon playback, a change in the quantity of light reflected from the spot 14 due to the pits 13 on the information recording track 12 is detected by the sum (A+B+C+D) of the output signals from the four-divided light receiving device 20 on the optical detector 10 shown in FIG. 3(b). Thus, it is possible to accurately play back the information recorded on the recording medium.

However, in the optical head of the prior art example, the light receiving elements on the optical detector are formed beforehand into a requisite pattern by a semiconductor process. Accordingly, upon regulation of the position of the light receiving element with respect to the optical beam, it has been required that the entire photo detector be moved with an accuracy of from a few microns to several tens of microns by a jig or the like provided separately, and the photo detector is fixed by means of screws or the like so that a shift in position does not occur. For this reason, there are problems that skillful technique is required for this regulating operation, shift in position is apt to occur at fixing so that time of re-regulation is required abundantly, and the like.

On the other hand, an optical head apparatus is disclosed in Japanese Patent Laid-Open No. 63-824 (824/1988) wherein, as shown in FIG. 4, an optical detector 25 is used, and wherein a plurality of light receiving elements S11 to S1010 are formed in a matrix arranged so as to dispense with mechanical focus regulation. In this optical head apparatus, the optical detector 25 illustrated in FIG. 4 is used to execute focus control by, for example, an astigmatism method. Light receiving elements (represented by Sa, Sb, Sc and Sd, respectively) belonging respectively to four regions Da, Db, Dc and Dd divided by an Xo axis and a Yo axis set provisionally are read. The Xo axis is set to one of the positions from X1 to X11, and the Yo axis is set to one of the positions from Y1 to Y11 such that the sum of the outputs from the light receiving elements belonging to the regions Da, Db, Dc and Dd (represented by Sa, Sb, Sc and Sd, respectively) achieves to the following relationship:

$$(Sa+Sb)-(Sc+Sd)=0$$

$$(Sa+Sc)-(Sb+Sd)=0$$

After the setting of the Xo axis and the Yo axis, a difference between sum of the outputs of the regions Da and Dc diagonally opposite to one another and the sum of the outputs of diagonally opposite regions Db and Dd, that is, $(Sa+Sc)-(Sb+Sd)$ is used for focus-control as a focus error signal.

In this prior art example, the optical detector 25 is not referred to as an image sensor of X-Y address type. Accordingly, it is considered that all the light receiving elements, that is, S11 to S1O1O must be read in order to produce a single focus error signal. For this reason, it takes a lot of time to produce a single focus error signal. Further, nothing is suggested nor referred to in the prior art example, regarding the fact that the tracking error signal is produced by the optical detector 25. Moreover, nothing is suggested nor referred to in the prior art example, regarding the fact that a playback signal is produced by the optical detector 25.

OBJECTS AND SUMMARY OF THE INVENTION

It is an object of the present invention to provide an optical head which is capable of high speed recording and playback in which, even after a photo detector has been immovably mounted on the optical head, adjustment or regulation by means of an electric signal of the position of a light receiving element which receives (detects) an optical beam is possible.

It is another object of the invention to provide an optical head in which a photo detector is set and held under a condition of high-precise positioning.

An optical head according to the present invention is arranged such that the optical head uses an image sensor of XY address type as a photo detector, a position of an optical beam falling on the photo detector fixed on the optical head is detected as an XY address, a patterned light receiving region similar to the patterned light receiving element of the prior art example is set with the XY addresses of the detected optical beam serving as a standard or reference, and XY addresses are assigned to the region so as to produce picture element signals within the region, to thereby yield an output from the photo detector. Since the optical head is of the XY address type, it is sufficient to read only the picture elements within the set region in order to yield a signal. Thus, a signal can be produced at a higher speed than in the prior art example in the above-described publications. Thus, of course, mechanical adjustment or regulation of position can be dispensed with.

BRIEF DESCRIPTION OF THE DRAWINGS

FIG. 6 is a view showing an arrangement of a CMD which is used as a photo detector according to the first embodiment;

FIG. 7 is a view showing the detailed arrangement of a picture element and a MOS switch of the CMD;

FIG. 8 is a block diagram showing the structure of a processing system which establishes a light receiving region of a photo detector for an optical beam originating from the CMD of the optical head, and which obtains an output signal from the light receiving region so established;

FIGS. 9(a) to 9(e) are explanatory views showing the timing at the time of detection of an XY address at which an optical beam is incident upon the CMD;

FIG. 10 is an explanatory view showing a light receiving region established on the CMD for receiving an optical beam;

FIG. 11 is an explanatory view showing the operation of reading the light recording region established on the CMD for receiving the optical beam;

FIG. 12 is a block diagram showing a hardware arrangement of a computing circuit;

FIG. 13 is a flow chart showing the processing contents of a process in which a reference address is set; and FIG. 14 is a schematic arrangement view of an optical-card recording and playback apparatus provided with a second embodiment of the invention.

DETAILED DESCRIPTION OF THE PREFERRED EMBODIMENTS

Various embodiments of the invention will hereunder be described in detail with reference to FIGS. 5 to 14 of the accompanying drawings.

An image sensor of XY address type which is used in a photo detector forming an optical head according to a first embodiment of the invention includes a charge modulation device (hereinafter, simply referred to as "CMD"), SIT, AMI, MOS and the like, for example.

Particularly, the CMD is an image sensor in which, although the image sensor is of a structure having an amplifier for each of its picture elements, the picture-element pitch can be reduced to about a few $\mu$m. The details of the CMD are disclosed in "A M0S phototransistor image sensor of gate storage type" in Television Society Journal Vol. 41, No. 11 (1987) (JOIT Vol. 3, No. 2/1988), or the like, and a detailed description thereof will be omitted. However, as compared with an image sensor such as a conventional CCD or the like, the CMD has superior advantages in that high-speed reading and non-destructive reading and the like, are possible. In the present embodiment, a case in which the CMD is used as a photo detector will be described.

Figure 5:
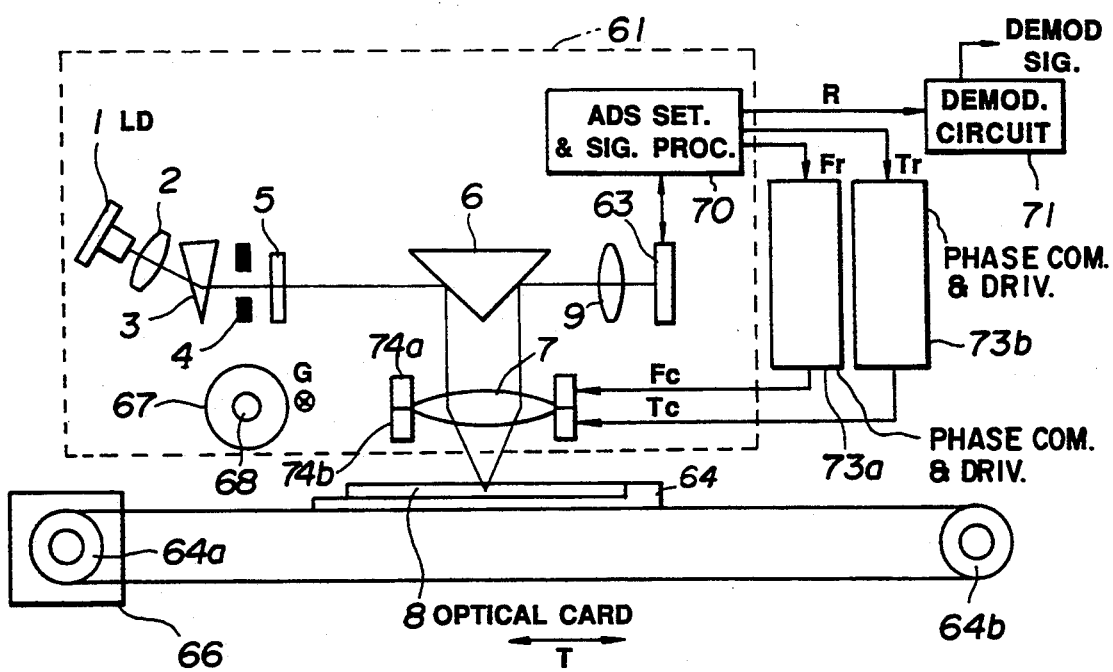
FIGS. 5 to 13 are views showing a first embodiment of the invention, FIG. 5 being a view of the schematic arrangement of an optical-card playback apparatus provided with an optical head according to a first embodiment of the invention.

FIG. 5 shows an optical-card reproducing or playback apparatus 62 which is provided with an optical head 61 according to a first embodiment of the invention.

Figure 1:
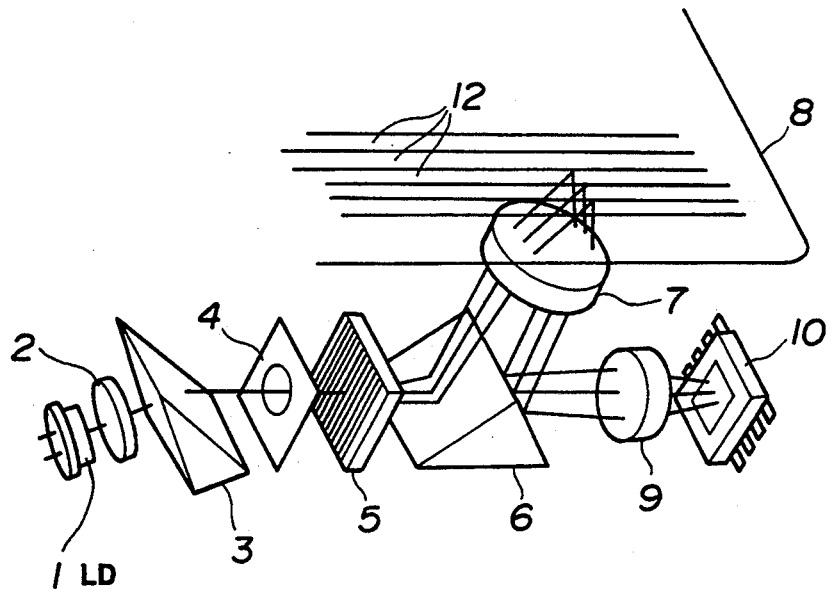
FIG. 1 is a view showing an arrangement of an optical system of an optical head according to a prior art example.
Figure 2:
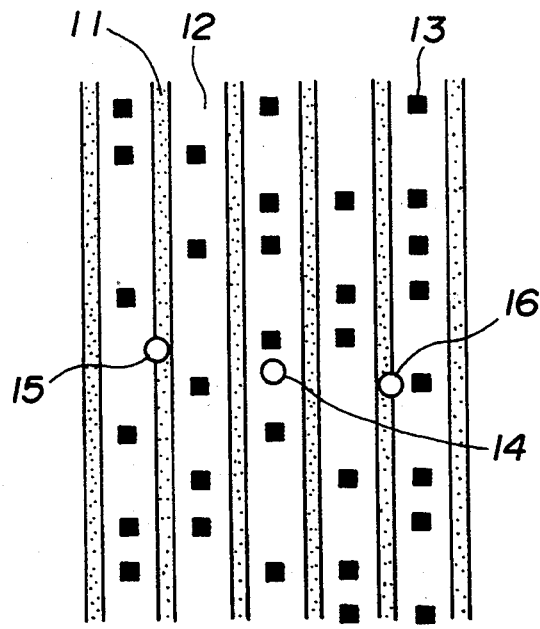
FIG. 2 is a view showing the position on an optical card of a spot deriving from three beams.
Figure 3A:
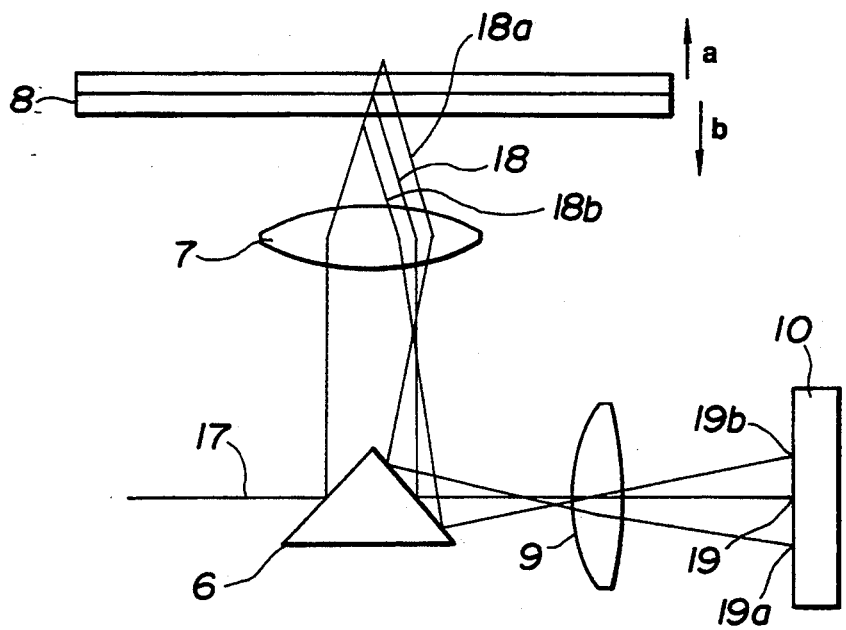
FIGS. 3(a) and 3(b) are explanatory views showing the generation of a focus error signal.
Figure 3B:
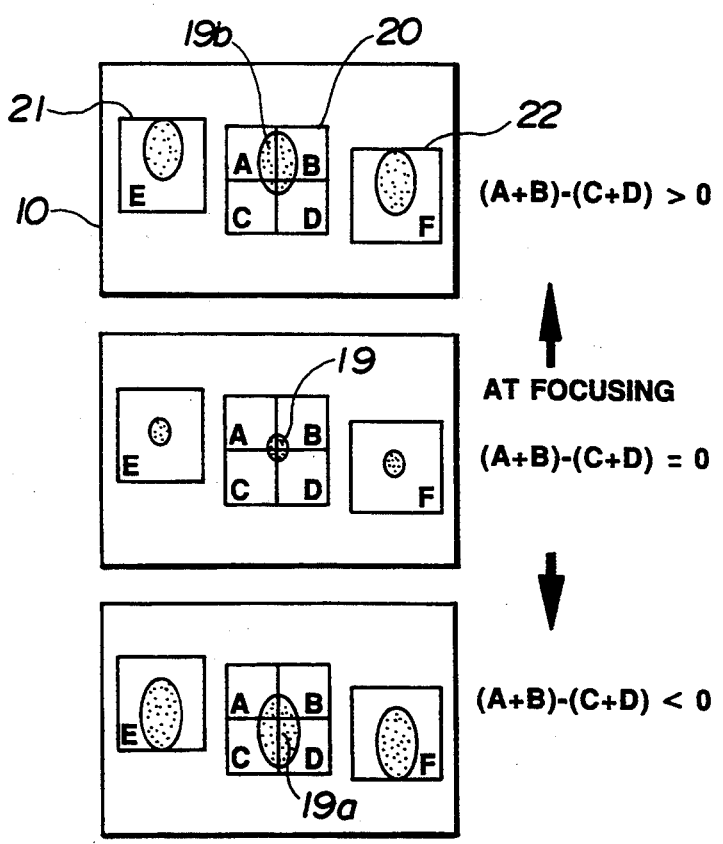
Figure 4:
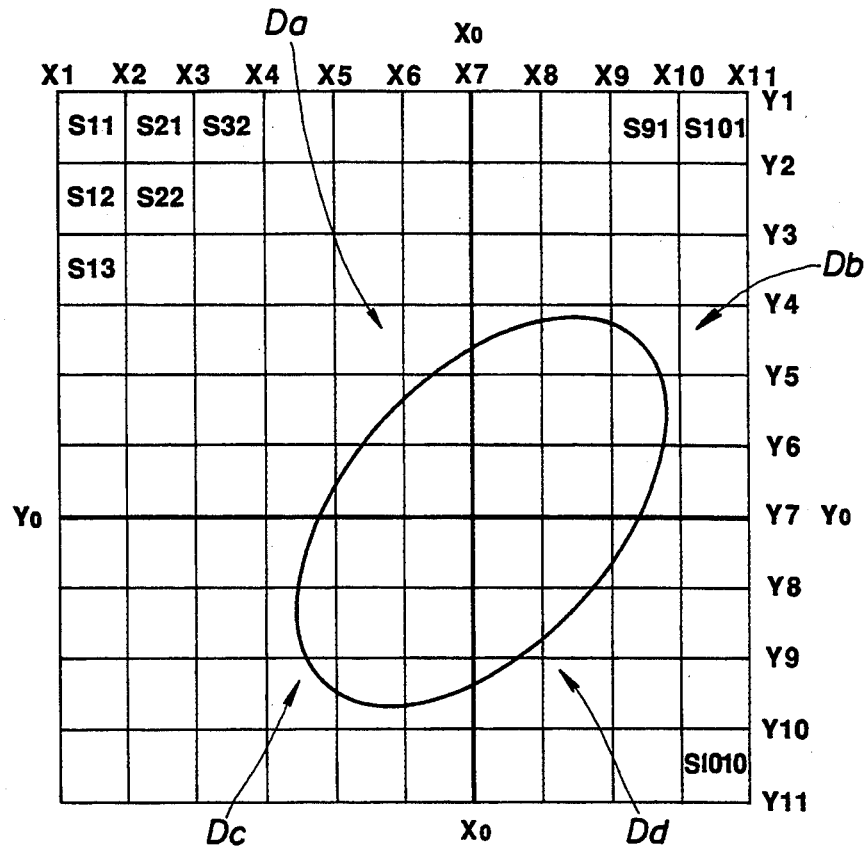
FIG. 4 is an explanatory view showing the manner in which an optical detector according to a second prior art example is used to set the axes dividing regions, for the purpose of obtaining a focus error signal.

The optical head 61 according to the present embodiment is arranged such that the arrangement of an optical system of the optical head 61 is substantially the same as that of the optical head shown in FIG. 1 according to the prior art example. However, the optical head 61 uses an optical detector 63 which is different from that illustrated in FIG. 1.

In this optical-card playback apparatus 62, an optical card 8 is mounted on a shuttle 64 which is mounted at a predetermined position on a carrier belt 65 which passes through a pair of pulleys 64a and 64b. By rotative driving of a motor 66, the optical card 8 is reciprocally carried in a track direction (left- and right-hand direction in FIG. 5) T in which a track extends, together with the shuttle 64.

On the other hand, the optical head 61 is arranged such that, by virtue of the fact that a helical screw 68 is rotatively driven by the motor 67, the optical head 61 mounted on the helical screw 68 is moved in a track-traversing direction (a direction perpendicular to the sheet of paper in FIG. 5) G which extends the perpendicularly to the track direction T, so as to enable optical card to access an ordinary track.

In photo detector 63 addresses are assigned to corresponding light receiving elements by means of address signals originating from an address-setting & signal-generating circuit 70. An output signal from the assigned light receiving element is inputted to the address-setting & signal-generating circuit 70. The address-setting & signal-generating circuit 70 executes signal processing to generate a read signal (playback signal) from the output signal of the light receiving element, a focus error signal Fr detecting deviation from a focused condition, and a tracking error signal Tr detecting positional deviation in a widthwise direction with respect to the track.

The lead signal is input to a demodulation circuit 71 so that a signal is generated in which error correction and the like are executed so as to be demodulated is generated. On the other hand, the focus error signal Fr and the tracking error signal Tr become respectively a focus control signal Fc and a tracking control signal Tc by means of a pair of phase-compensation & drive circuits 73a and 73b. The focus control signal Fr and the tracking control signal Tr are supplied respectively to a focus coil 74a and a tracking coil 74b of a lens actuator for driving an objective lens 7, so as to control the objective lens 7 such that an optical beam (spot) irradiated through the objective lens 7 is brought into a focused condition and a tracking condition.

Figure 6:
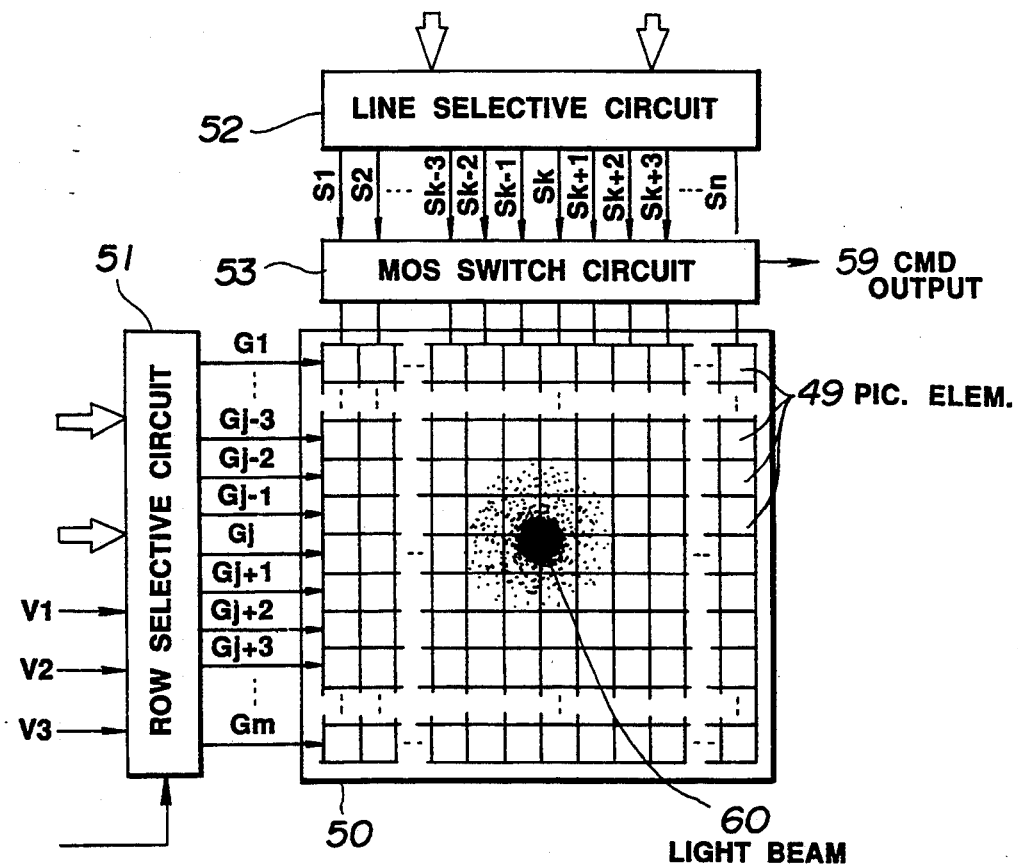
Figure 7:
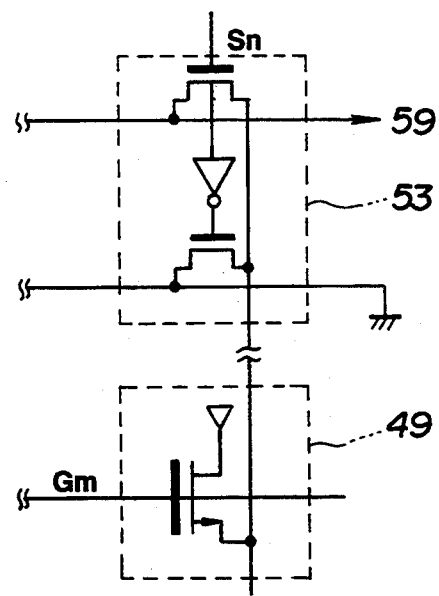

The optical head 61 according to the first embodiment uses a CMD which is arranged as shown in FIGS. 6 and 7. Further, control of the CMD and generation of the photo detecting signal are executed by a circuit illustrated by a block diagram in FIG. 8.

The arrangement of the CMD used in the photo detector 63 comprises, as shown in FIG. 6, a CMD light receiving section 50 in which picture elements 49 are arranged, a row selective circuit 51 for selecting rows Indicated as G1~Gm which is connected to gates of the respective picture elements of the CMD light receiving section 50, a MOS switch circuit 53 retrieving outputs from each line connected to sources of the respective picture elements 49, and a line selective circuit 52 connected to the MOS switch circuit 53 for selecting lines indicated as S1~Sn. Also, the details of the picture elements 49 and the MOS switch circuit 53 are arranged as shown in FIG. 7.

The row selective circuit 51 is arranged such that a low voltage V1 which generally cuts off the CMD from all the lines is applied to the gates, and the picture elements 49 are brought to a condition in which charge is stored in accordance with an amount of light received.

When a Y-address signal 55 and a Y-pattern signal 57 are input, lines within a range assigned to the Y-pattern signal 57 are selected, (with lines assigned to the Y-address of the Y-address signal 55 serving as a reference (a central address, for example)), for the application of reading gate voltage V2, so that the picture elements 49 connected to selected lines are brought to a condition capable of being read. Furthermore, when a CMD reset signal 58 is input, reset potential V3 is applied to all the lines, so as to cause the emission of charges stored in all the picture elements 49, independently of the condition of line selection.

On the other hand, the line selective circuit 52 receives an X-address signal 54 and an X-pattern signal 56, and selects lines within a range assigned by the X-pattern signal 56 by means of the MOS switch circuit 53 with a line assigned by the X-address of the X-address signal 54 serving as a reference. Accordingly, a signal in accordance with the amount of received light of the picture elements 49 within a region corresponding to the XY-address range expressed by the Y-address of the lines selected by the line selective circuit 52 and the X-address of the lines selected by the line selective circuit 52 is output as a CMD output 59.

Figure 8:
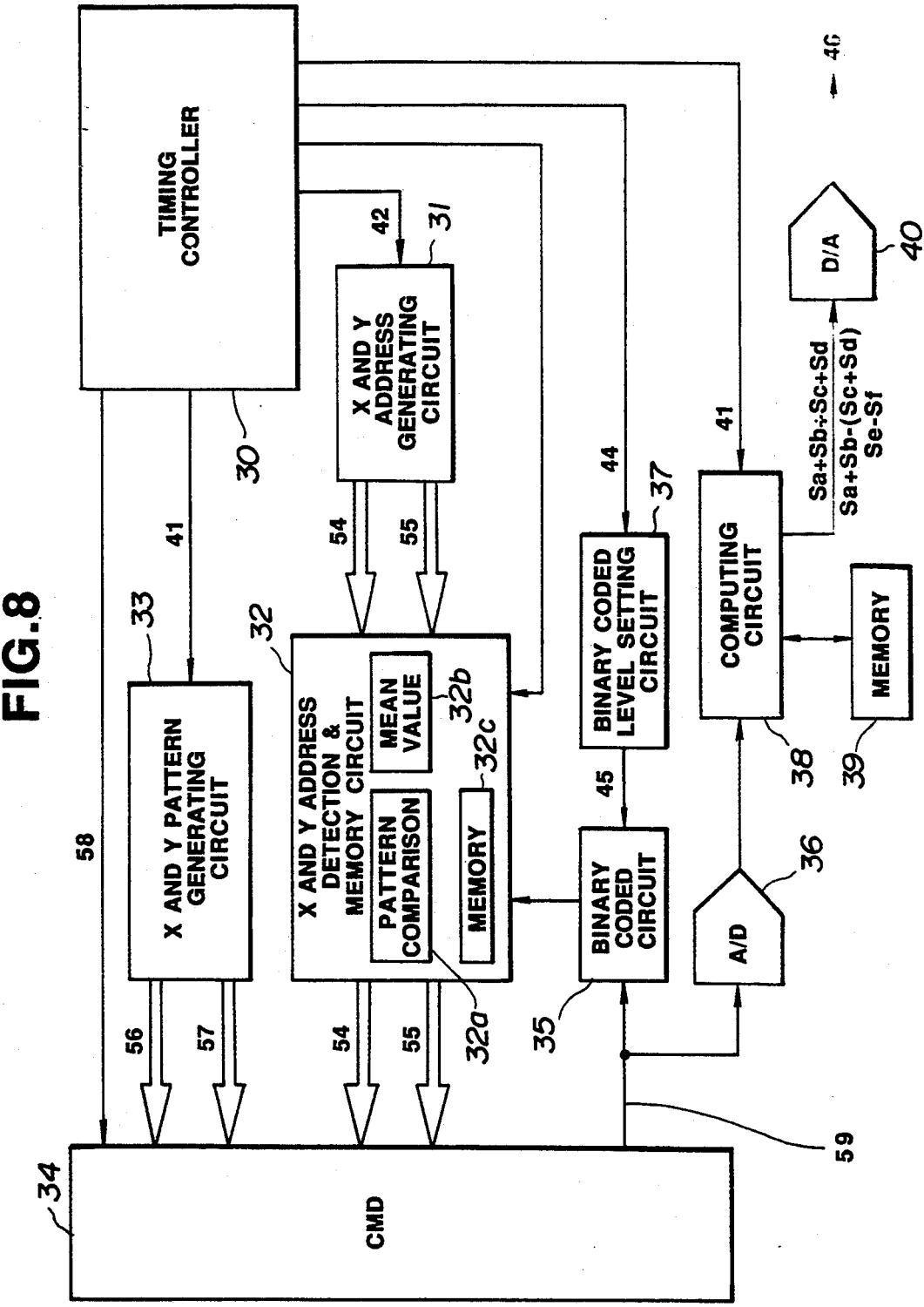

FIG. 8 shows a block arrangement of the address-setting & signal-processing circuit 70 which serves as a CMD control system in the optical head. In a case where a timing controller 80 executes adjustment or regulation of the detection of the optical beam position, the CMD reset signal 58 is sent to the line selective circuit 51 of a CMD 84, so as to cause the emission of the charges of all the picture elements 49. The timing controller 30 outputs the pattern selective signal 41 to an X and Y pattern generating circuit 33. The X and Y pattern generating circuit 33 outputs a signal commanding an address width corresponding to the magnitude of the light receiving pattern assigned by the pattern selective signal 41 in X and Y directions, to the CMD 34.

Moreover, the timing controller 30 outputs the address selective signal 42 to the X and Y address generating circuit 31. The X and Y address generating circuit 31 outputs the X address signal 54 and the Y address signal 55 to the CMD 34 through the X and Y address detection & memory circuit 32. A beam selective signal 43 from the timing controller 30 is applied to an X and Y address detection & memory circuit 32.

The CMD output 59 output(ted)from the CMD 34 is input to a binary coded circuit 35, and is inputted to an A/D converter 36. A binary coded level 45 serving as a reference at the time the binary code is executed from a binary coded level setting circuit 37 is input to the binary coded circuit 35. The binary coded circuit 35 compares the CMD output 59 with the binary coded level 45, to output a binary signal 47 to the X and Y address detection & memory circuit 32. The X and Y address detection & memory circuit 32 adds the binary signal 47 when successive values of the binary signal 47 are detected, and finds the mean value after the addition. The X and Y address detection & memory circuit 32 detects an address serving as a center of the mean value, and stores the address.

A level switching signal 44 is applied to the binary coded level setting circuit 37 from the timing controller 30, so that the binary coded level 45 can be switched and set by the level switching signal 44.

The CMD output 59 digitalized by the A/D converter 36 is input to a computing circuit 38. The CMD output 59 is temporarily stored in a memory 39 in synchrony with a pattern selective signal 41. The CMD output 59 is subjected to computation processing such as calculation of the sum or the difference of the signals of respective patterns and, subsequently, is D/A-converted by a D/A converter 40 so as to be made into an optical detecting signal 46 such as the focus error signal Fr, the tracking error signal Tr, the playback signal R and the like.

Figure 9:
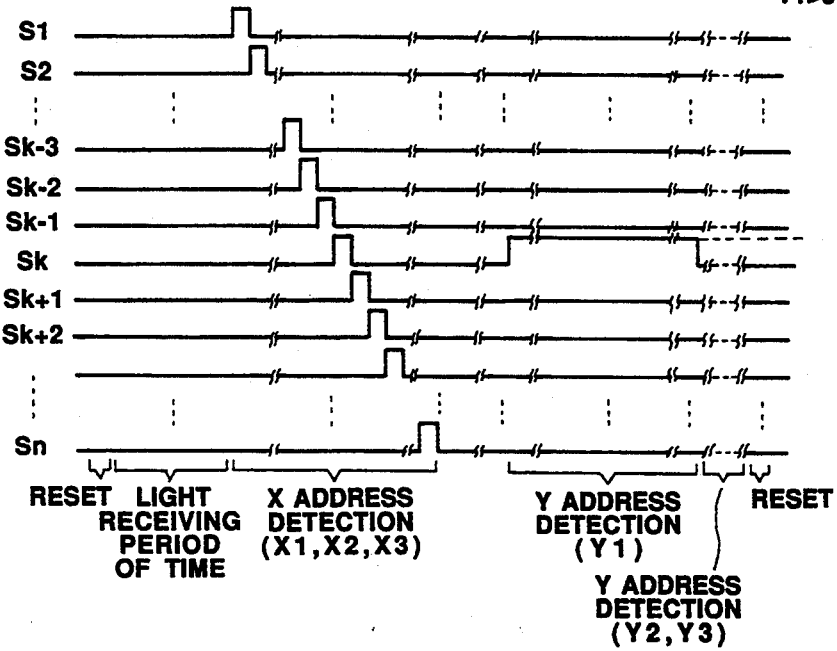

Regulation of the CMD 34 functioning as the optical detector 63 and generation of the optical detecting signals such as the focus error signal, the tracking error signal and the like will next be described with reference to a view of the arrangement of the CMD in FIG. 6, a block diagram in FIG. 8, the timing of FIG. 9 and a view of the arrangement of a light receiving pattern in FIG. 10.

Detection of the position of the optical beam 60 on the CMD 34 is executed as follows. First, the CMD reset signal 58 is sent to the line selective circuit 51 as shown in FIG. 9c. Charges of all the picture elements are emitted by the line selective circuit output shown in FIG. 9d (represented by reset at the lowermost stage or row in FIG. 9). Subsequently, the laser diode 1 is radiated for a predetermined period of time so as to store a charge in the picture element which receives the optical beam. This time period is indicated in the lowermost stage in FIG. 9 as a light receiving period of time. Periods of light emission of laser diode and of storage of charge shown in FIG. 9.

Subsequently, X address detection is first executed. A line selective circuit output shown in FIG. 9e is scanned by the line selective circuit 52, that is, a line from S1 to Sn of the X address is scanned, during the time at which the reading potential V2 is applied to all the gates of G1~Gm by the line selective circuit 51, as shown in FIG. 9d. If one (1) of the three (3) optical beams is received at the position shown in FIG. 6, an output is brought to the CMD output 59 as shown in FIG. 9b.

The CMD output 59 is compared with the binary coded level 45 at the binary coded circuit 35, and is changed to the binary signal 47 of "0" ("L") or "1" ("H") as shown in FIG. 9a. When the line including the picture elements receiving the optical beam is selected, the signal of "1" is output to the X and Y address detection & memory circuit 32. In the X and Y address detection and memory circuit 32, in a case, for example, where the binary signal 47 is arranged such that "1" is detected continuously the addresses corresponding to the continuous portion (repeating portion) are added to each other. A mean value of these addresses is determined, to thereby detect the reference X address corresponding to the reference picture element which receives the optical beam (the binary signal 47 is compared with the pattern of "11" by a pattern comparator 32a, for example and, in a case where at least "11" is detected, the binary signal 47 is inputted to a mean-value circuit 32b for finding the mean value (central value) of the addresses. The values of the input addresses are added together to determine the mean value of these addresses). The mean value is stored in a memory 32c.

Since a signal due to the three optical beams is generated at the CMD output 59 during each scanning of the X addresses, reference X addresses X1, X2 and X3 can be produced corresponding respectively to the three optical beams. FIG. 9 shows only one CMD output. However, X address detection (X1, X2 and X3) is described at the lowermost row in FIG. 9.

Detection of Y address is executed next. The line selective circuit 52 scans the detected lines of the X address, that is, the gates of the rows indicated by the Y addresses from G1 to Gm by the row selective circuit 51 as shown in FIG. 9d during the time the detected X address selects Sk with respect to the optical beam indicated by X1=Sk, as shown in FIG. 9e, for example.

Close to the time of the detection of the X address, when the picture element receiving the optical beam is selected, a signal as shown in FIG. 9b is output to the CMD output 59. As this binary signal 47, there can be produced ... 0011110 ... as shown in FIG. 9a. In this case, the Y address Y1 at the center of the Y addresses corresponding to the binary signal 47 in which "1" continues is found as a reference Y address. The Y address Y1 is detected and stored in the X and Y address detection & memory circuit 32.

Similar operations are further executed with respect to the optical beams of the X addresses X2 and X3. Thus, the central Y addresses Y2 and Y3 serving as references are found. Subsequently, resetting is executed by the CMD reset signal 58. In this manner, the reference XY addresses of the three respective optical beams are detected and stored.

In connection with the above, by the function of non-destructive reading of the CMD 34, it 1s possible to continuously execute the detection of X address and Y address as described above, by storing the charge only once. For this reason, in the case of a destructive reading device like a CCD, since the change of the device is destroyed by the detection of either or both addresses of XY, it is required to once transmit the one address to the memory once, while it is possible to detect the reference XY address without the use of such memory in the case of the CMD 34. For this reason, an advantage is creased by the fact that the memory is unnecessary, and it is possible to execute detection of the XY address in a short period of time.

Generation of the optical detecting signal is executed as follows. That is, the X and Y address detection & memory circuit 32 outputs the XY address representing the positions of the three stored optical beams to the CMD 34 from the timing controller 30 in accordance with the beam selective signal 43. Simultaneously, the X and Y pattern generating circuit 33 outputs an X pattern and a Y pattern in accordance with the pattern selective signal 41, to the CMD 34.

In connection with the above, the X and Y pattern generating circuit 33 is a circuit for generating a signal indicating the width of an address in a plus direction and in a minus direction with an XY address value X1, Y1 or the like serving as a reference, in order to give the magnitude of a light receiving pattern in X and Y directions indicated by the pattern selective signal 41. Since, depending upon an optical system, the magnitude of the optical beam formed on the CMD 34 is more or less predetermined, the above-described width area (region) of an address is decided in correspondence with the magnitude of the optical beam.

Figure 10:
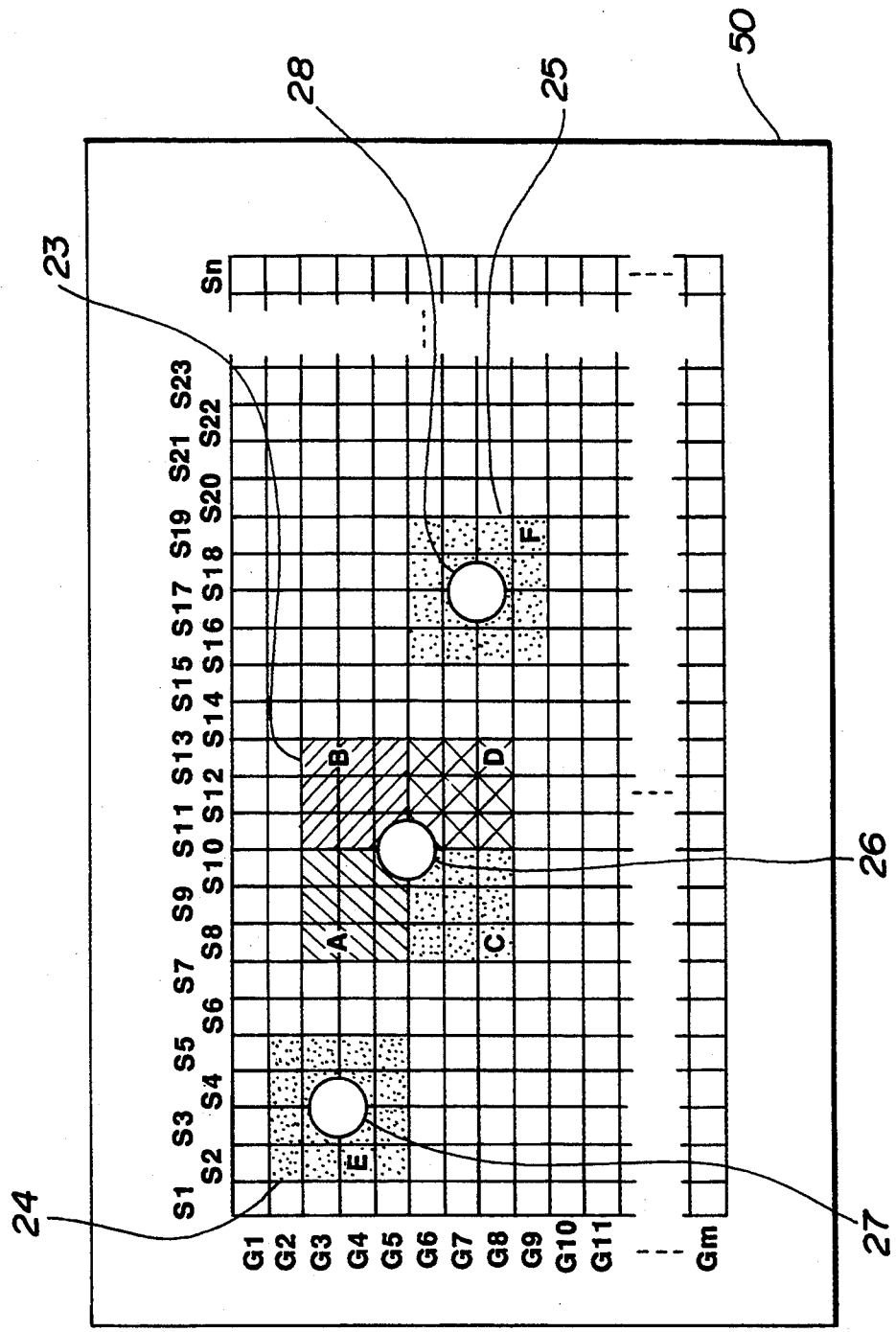

Accordingly, when the zero-order diffracted optical beam 26 and primary diffracted optical beams 27 and 28 are received at the position shown in FIG. 10, the lines of G2~G5 and the rows of S2~S5 are selected with respect to the primary diffracted optical beam 27. A sum of the signal values of the picture elements within the light receiving pattern of E is retrieved as a CMD output.

Next, a four-divided light receiving pattern 23 is set with respect to the zero-order diffracted optical beam 26. The picture elements within the four parts of light receiving pattern A, B, C and D, are selected as lines of G3~G5 and rows of S8~S10, and lines of S3~S5 and rows of S11~S13 in order. The sum of the signal values of the picture elements in the respective parts of the light receiving patterns are consecutively retrieved taken out as the CMD output.

Similarly, a range of lines of G6~G9 and a range of rows of S16~S19 are selected also with respect to the further other primary diffracted optical beam 28, to retrieve the sum of the signal values of the picture elements within the light receiving pattern 25 of F as a CMD output.

These consecutive operations are repeated in a sufficiently rapid cycle with CMD resetting and laser diode emitting periods of time between the consecutive operations, whereby a time shared signal is produced from the CMD output equivalent to a signal from each light receiving element of the conventional optical detector provided with divided light receiving elements.

Figure 11:
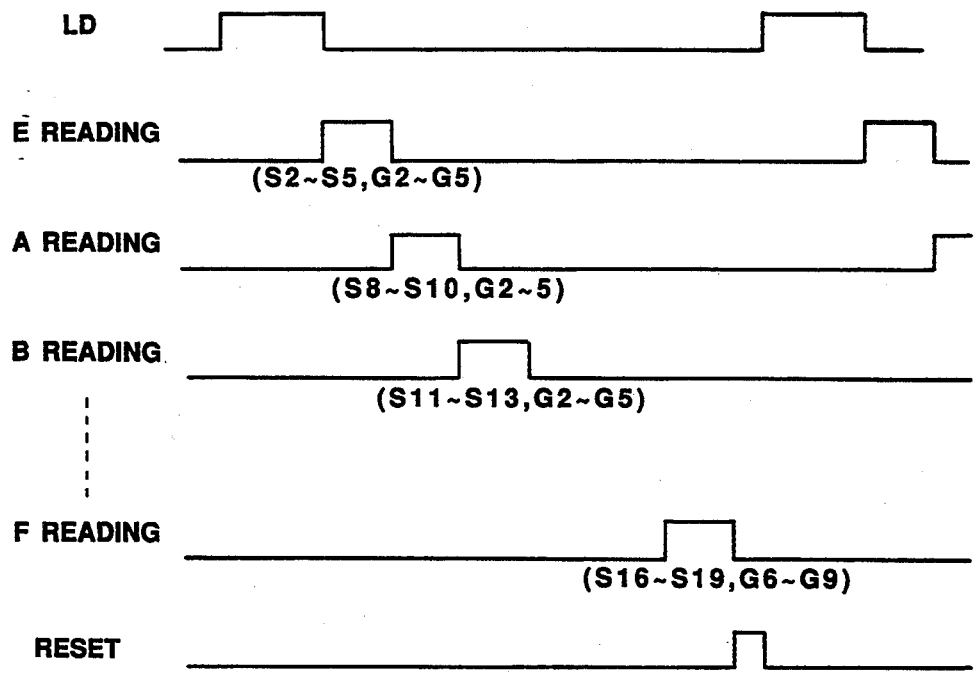

An example of reading signals from these light receiving patterns A~F is shown in FIG. 11. In the example illustrated in FIG. 11, the laser diode 1 emits light in the form of pulses. During a turned-off period of time after the radiating period of time, reading of the light receiving patterns E, A, B ... F, for example, is successively executed in time-sharing. Subsequently, operations in which the laser diode 1 is reset, and the laser diode 1 emits light in the form of pulses are repeated again.

In FIG. 10, reading of the various picture elements of the light receiving pattern E, for example, is executed by virtue of the fact that the XY address signal in which the row addresses are G1 to G5, and the line addresses are S2 to S5 are applied to the CMD 34 (in this case, the reference X addresses are S3 and S5, the reference Y addresses are G3 and G5, and the address widths are four picture elements, respectively).

The signals of the light receiving patterns A~F read like the above-described reading example, that is, the time-shared CMD output signal is A/D-converted by the A/D converter 36 and, subsequently, is selected in synchrony with the pattern selective signal 41 from the timing controller 30 at the computing circuit 38 and is temporarily stored in the memory 39. Signal data of the light receiving patterns A~F temporarily stored in the memory 39 are arranged such that the sum of the signal data is found for every light receiving patterns I (I=A ..., F) by the computing circuit 38, and is brought to a signal Si (i=a, ..., f). Focus error signal data and tracking error signal data are further generated by a process of computation of the sum and the difference of the signal Si, that is, by computation of (Sa+Sb)−(Sc+Sd) and (Se−Sf). Playback signal data are generated by computation of (Sa+Sb)+(Sc+Sd).

Figure 12:
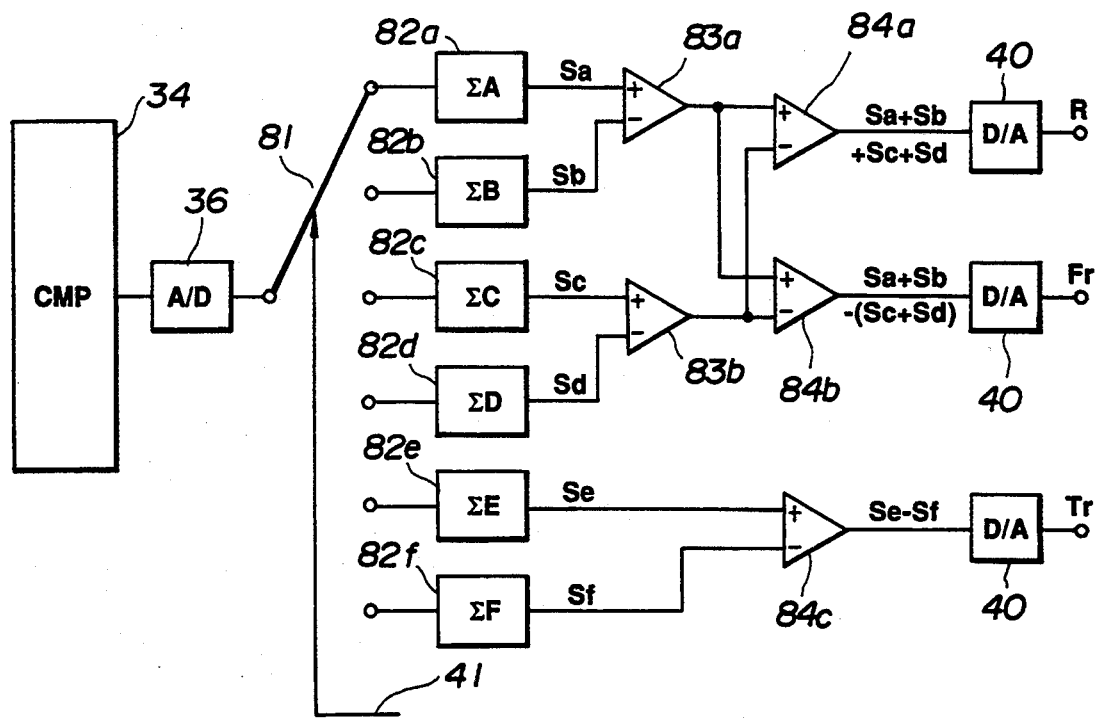

FIG. 12 is a block diagram in which the processing contents of the computing circuit 38 executing processing to generate a playback signal or the like from the CMD output signal or the like is arranged in the manner of hardware. The CMD output signal is converted into a digital signal by the A/D converter 36 and, subsequently, is input to cumulative adders 82a, 82b, 82c, 82d, 82e and 82f through a change-over switch 81 (in FIG. 12, ΣA indicates that outputs from the picture elements belonging to the light receiving pattern A are added to each other).

The change-over switch 81 is switched by the pattern selective signal 41. The CMD output signal received by the picture elements of the light receiving patterns are inputted to the selected cumulative adder 82i (i=a, ..., f), and are cumulatively added to each other, to generate a signal Si. Signals Sa, Sb and Sc+Sd are added to each other by a pair of adders 83a and 83b so that sum signals Sa+Sb and Sc+Sd are generated.

The sum signals Sa+Sb and Sc+Sd are input respectively into an adder 84a and a subtracter 84b, so that playback signal data (Sa+Sb)+(Sc+Sd) and focus error signal data (Sa+Sb)−(Sc+Sd) are generated. Furthermore, signals Se and Sf are inputted to a subtracter 84c so that tracking error signal data (Se−Sf) are generated.

These signal data are further D/A-converted by the D/A converters 40 so as to become signals such as the photo detecting signal 46, the focus error signal Fr, the tracking error signal Tr, the playback signal R and the like. As shown in FIG. 5, these signals are output to the demodulation circuit 71 and the pair of phase-compensation & drive circuits 73a and 73b.

The optical detecting signal 46 produced in this manner assigns only address signals corresponding to the region where the optical beam reflected from the optical card 8 is received, that is, in the above-described specific example, a picture element region of light receiving pattern portions A∼F, and reads the address signal. Accordingly, it is possible to read the address signal at a considerably higher speed, that is, in a shorter period of time than the case where all the light receiving elements are arranged in the form of a matrix are read.

For the reason discussed above, even in a case where, for example, recording or playback is executed at a high speed, it is possible to reduce the time interval in which the tracking error signal is produced, for example. As a result, it is possible to reduce shift in tracking. The same is applicable also to the focus error signal. Moreover, it is possible to reduce the minimum pit interval capable of being read, in a case where playback is executed.

Further, with respect also to a case where the optical system or the like changes in form with the passage of time, compensation can be made by the above-described regulation or adjustment.

Figure 13:
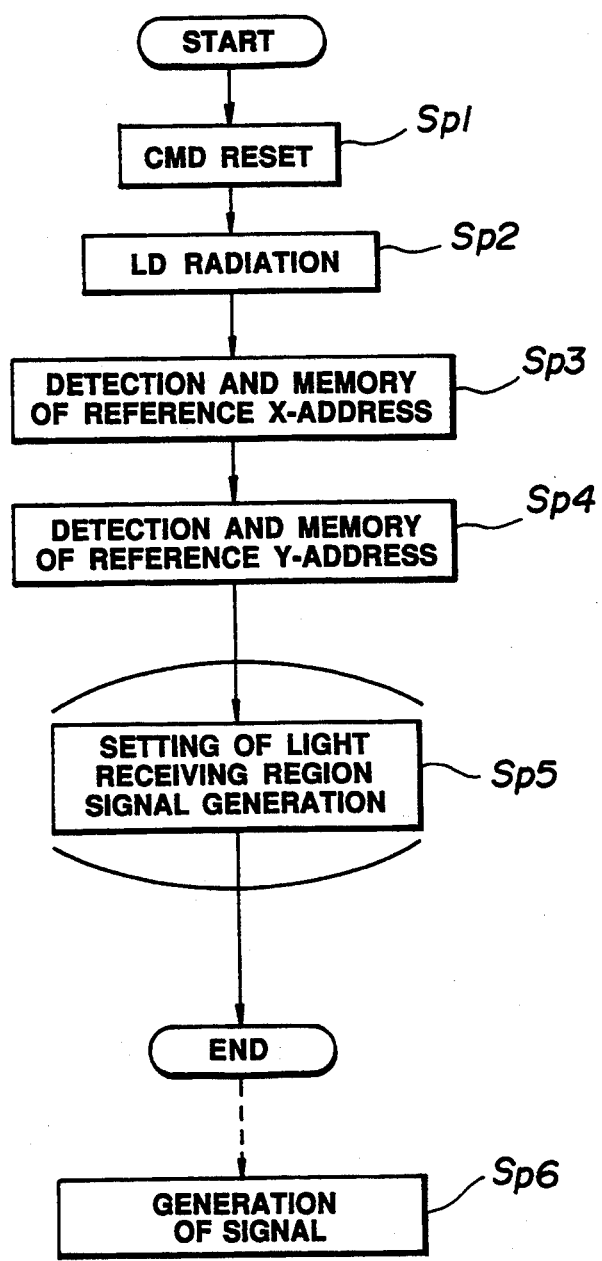

A flow chart of the setting of the reference XY address in the above-described first embodiment is shown in FIG. 13. As shown in step Sp1, CMD resetting is first executed. Thereafter, as indicated by a step Sp2, the laser diode 1 is irradiated. A return light of the optical beam irradiated to the optical card 8 is received by the CMD 34 (a photoelectric transfer signal is generated). Subsequently, processing of the detection of the reference X address is executed as indicated by a step Sp3. The reference X address is detected and stored. Furthermore, as indicated in step Sp4, processing of the detection of the reference Y address is executed. The reference Y address is detected and stored. The operation of setting the reference XY addresses is completed. In this case, as indicated in step Sp5, X and Y address regions of an adequate range are set with the reference X address and Y address serving as a center. Setting of the reference XY addresses may be completed after the light receiving region used in receiving the light of the optical beam has been decided.

Subsequently, in a playback mode, only address signals corresponding to a picture element belonging to respective light receiving regions (that is, portions of the CMD 34) are applied in order to read the photoelectric transfer signal. The process moves to a signal generating step for generating a signal such as a playback signal or the like. The processing contents of these steps have already been described with reference to FIG. 9 and the like.

FIG. 14 shows an optical-card recording and playback apparatus 90 which is provided with an optical head 91 according to a second embodiment of the invention. The optical head 91 comprises a second laser diode 92 for generating a recording optical beam in FIG. 5. In a recording mode, an optical beam from the second laser diode 92 is incident in S-polarization upon a polarization beam splitter 96 through a collimator lens 93, a shaping prism 94 and a stop 95, and almost 100 percent of the optical beam is reflected, by a mirror 6. Subsequently, the optical beam is condensed by an objective lens 7, to form a small circular beam spot at a track center of an optical card 8.

A recording signal is modulated by a modulating circuit 97. A radiating output from the second laser diode 92 is brought to a binary level including a high level condition and a low level condition by the output signal from the modulating circuit 97. A pit is formed on the optical card 8 by the optical beam under the high level condition. The light reflected from the optical card 8 is not received by a photo detector 63 in the present embodiment. In this case, servo control such as focus control or the like is executed by a playback optical beam. In this connection, an optical beam from the laser diode 1 is incident upon the polarization beam splitter 96 in the form of P polarization. Almost 100 percent of the optical beam is transmitted. The other arrangement is the same as that illustrated in FIG. 5, and the description thereof will be omitted.

In connection with the above, the above-described embodiment has been described such that picture element signals of light receiving patterns A∼F are read successively, to produce playback signal detection and error signal detection. However, the arrangement may be such that the number of times the playback signal is produced per unit time increases more than the number of times producing the error signal is produced, for example, to further reduce the minimum pit interval capable of being read.

As described above, in the optical head according to the present embodiment, the setting of the position of the light receiving pattern of the photo detector with respect to the optical beam is executed by an electric signal so that photo detecting signals 46 such as the focus error signal, the tracking error signal or the like can be produced. In this connection, although the description has been omitted in the present embodiment, it is necessary to accurately set the focusing position of the objective lens or align and the position of the optical card upon adjustment of the photo detector.

However, the optical head according to the present embodiment has the following advantage. Even if the focusing position of the objective lens and the position of the optical card shift slightly away from each other upon regulation, the focussing condition is confirmed while the XY addresses of the optical beam increase and decrease one by one, for example, by means of an electric signal after adjustment, whereby it is possible to easily execute correction of the adjusted shift.

The adjustment of the alignment of the position can be automated. For example, a drive signal is applied, in a step manner, to a focus actuator such that the distance from the objective lens to the optical card changes little by little, and a beam width or the like (an address width in which a "1" is repeatedly detected, for example) in the binary coded signal is detected upon application of the drive signal in the form of a step, to find the drive-signal level when it is minimized. The position of the objective lens under a condition in which the minimized drive signal level is applied corresponds to the focusing condition with respect to the optical card. Subsequently, the arrangement may be such that processing is executed to find the addresses X1~Y3, or a central address among the addresses when beam width is minimized to find the addresses X1~Y3 and the like.

In the present embodiment, the optical head of the information recording and playback apparatus for recording and playing back information with respect to the optical card has been described. However, it will be apparent that the optical head is applicable, not depending upon the kind or type of the optical recording medium such as an optical disc, an optical magnetic disc or the like. Further, it will be clear that similar advantages can be produced if another focus detecting methods such as an astigmatism method, a knife edge method and the like, and/or another type of tracking detection system is used. In this connection, the present invention can execute positioning of the optical beam with respect to the light receiving member with high accuracy by increase of the number of divisions thereof.

As described above, according to the present invention, since the light receiving pattern can be set by the electric signal after the optical detector has been fixed, not only is a regulating jig high in mechanical accuracy unnecessary, but also there is no affection or influence of shifting upon the fixing of the photo detector. Thus, skillful technique is not required, and the time required for regulation can be shortened. Moreover, since automation of the regulation can be facilitated, mechanical regulation is not needed. Further, since only the picture elements within the region corresponding to the light receiving pattern can be read, there can be produced advantages that the signal can be read at a high speed, as compared with the optical detector formed such that the light receiving elements are merely arranged in the form of a matrix.

What is claimed is:

1. An optical head comprising:
   a light source generating an optical beam;
   an objective lens for irradiating said optical beam to an optical recording medium;
   a photo detector for receiving a return light of the optical beam irradiated to said optical recording medium by said objective lens;
   an image sensor of XY address type for forming said optical detector, said image sensor having a light receiving surface for receiving said return light and a plurality of photo detecting picture elements assigned with XY addresses thereon, said optical detecting picture elements being arranged in a two-dimensional matrix on said light receiving surface, said image sensor being capable of reading photoelectric conversion signals of photo detecting picture elements corresponding to XY addresses by assignment of said XY addresses;
   reference XY addresses setting means having a light receiving region for receiving said return light, said light receiving region being set on said light receiving surface, for setting reference XY addresses corresponding to the photo detecting picture elements included in said light receiving region; and
   reading means for assigning only said reference XY addresses corresponding to said photo detecting picture elements included in said light receiving region, and for reading a part of all the photo detecting picture elements arranged on said light receiving surface as an output signal from said image sensor.

2. An optical head according to claim 1, wherein said image sensor of XY address type is capable of reading, in a non-destructive manner, the photoelectric conversion signals of photo detecting picture elements, corresponding to said XY addresses.

3. An optical head according to claim 1, wherein said image sensor of the XY address type is a charge modulation device.

4. An optical head according to claim 1, wherein said light receiving region is set on said light receiving surface at a plurality of locations, and wherein said reference XY addresses setting means sets reference XY addresses corresponding to the photo detecting picture elements included in said light receiving region at said plurality of locations.

5. An optical head according to claim 1, wherein said photoelectric conversion signals output from the photo detecting picture elements included in said light receiving region are used to generate a playback signal for playing back information recorded on said optical recording medium.

6. An optical head according to claim 1, wherein said photoelectric conversion signals output from the photo detecting picture elements included in said light receiving region are used in focus control for maintaining an optical beam irradiated onto said optical recording medium by said objective lens, in a focused condition.

7. An optical head according to claim 1, wherein said photoelectric conversion signals output from the photo detecting picture elements included in said light receiving regions are used for such tracking control such that the optical beam irradiated to a track provided on said optical recording medium by said objective lens follows said track.

8. An optical head according to claim 7, including a diffraction grating at a location between said light source and said objective lens, for generating from the optical beam generated at said light source, two sub-beams which are used for executing tracking control.

9. An optical head according to claim 1, wherein said optical recording medium is a rectangular optical card.

10. An optical head according to claim 1, wherein said light source has generating means for the recording optical beam, for generating an optical beam for recording information onto said optical recording medium.

11. An optical head according to claim 1, wherein, in a case where said reference XY addresses are renewed, said reading means reads the photoelectric conversion signals of all the optical detecting picture elements arranged on said light receiving surface.

12. An optical head according to claim 11, wherein said reference XY addresses setting means has renewing means for renewing said reference XY addresses based on all the photoelectric conversion signals read by said reading means.

13. An optical head according to claim 12, wherein said resetting means has a binary coded circuit for generating a binary code signal from all the photoelectric conversion signals which are read by said reading means, and a reference-address detecting circuit for detecting a central address during a period of time in which said binary signal is "H", so as to set a reference XY address.

14. An optical information playback apparatus comprising:
- a light source generating a light beam:
- an objective lens irradiating said optical beam on an optical recording medium;
- a photo detector for receiving a return light of said optical beam irradiated on said optical recording medium by said objective lens:
- an image sensor of XY address type for forming said photo detector, said image sensor having a light receiving surface for receiving said return light, and a plurality of photo detecting picture elements assigned by XY addresses arranged, in a two-dimensional matrix manner, on said light receiving surface, said image sensor being capable of reading photoelectric conversion signals of photo detecting picture elements corresponding to XY addresses by assignment of said XY addresses;
- track-positional shift-detecting means for detecting a shift in position of said optical beam irradiated onto said optical recording medium in a track widthwise direction, on the basis of a signal output from said image sensor;
- signal playback means for playing back a signal corresponding to information recorded on said optical recording medium at a location where said optical beam is irradiated from an output of said image sensor:
- reference XY addresses setting means in which a light receiving region receiving a part of the optical beam on said light receiving surface of said image sensor is set on said light receiving surface, for setting reference XY addresses corresponding to photo detecting picture elements included in said light receiving region; and
- reading means for assigning only said reference XY addresses corresponding to said photo detecting picture elements included in said light receiving region, for reading a part of all said photo detecting picture elements arranged on said light receiving surface as an output signal from said image sensor.

15. An optical information playback apparatus according to claim 14, wherein, in a case where said reference XY addresses are reset, said reading means reads photoelectric conversion signals of all said photo detecting picture elements arranged on said light receiving surface.

16. An optical information playback apparatus according to claim 15, wherein said reference XY addresses setting means has renewing means for renewing said reference XY addresses from all said photoelectric conversion signals read by said reading means.

17. An optical information playback apparatus according to claim 16, wherein said renewing means has a binary coded circuit for generation a binary coded binary signal from all said photoelectric conversion signals which are read by said reading means, and reference-address detecting means for detecting a central portion of a period of time in which said binary signal is "H", so as to set a reference XY address.

18. A method of electrically positioning a light receiving region of an optical beam in an optical head, comprising:
- a reset processing step of resetting all the photo detecting picture elements of an image sensor of XY address type capable of reading photoelectric conversion signals from photo detecting picture elements corresponding to XY addresses, said image sensor of XY address type being used as a photo detector of the optical head, a plurality of optical detecting picture elements assigned with XY addresses and arranged in a two-dimensional matrix manner;
- a light receiving step of receiving a return light of said optical beam irradiated onto said optical recording medium, by said image sensor;
- a reference-address setting step of applying an address signal to said image sensor to detect a reference address corresponding to a central position comprised of said photo detecting picture elements which receive said optical beam from a binary level of
- photoelectric conversion signals of said photo detecting picture elements which receive said return light, thereby storing said reference address; and
- a signal generating step of applying an address signal to the photo detecting picture elements included in a light receiving region so set as to include a photo detecting picture element corresponding to said reference address, for generating at least one of a playback signal corresponding to information recorded onto said optical recording medium and a servo signal for controlling said optical beam irradiated to said optical recording medium, from the photoelectric conversion signals from the photo detecting picture elements included also in said light receiving region.

* * * * *